(12) United States Patent
Faulhaber (10) Patent No.: US 8,910,953 B2
(45) Date of Patent: Dec. 16, 2014

(54) DEVICE FOR ACTUATING BRAKE MEANS OF MOBILE APPLIANCES

(75) Inventor: Thomas Faulhaber, Bergrheinfeld (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 879 days.

(21) Appl. No.: 12/990,392

(22) PCT Filed: Apr. 29, 2009

(86) PCT No.: PCT/EP2009/003115
§ 371 (c)(1),
(2), (4) Date: Jan. 18, 2011

(87) PCT Pub. No.: WO2009/132844
PCT Pub. Date: Nov. 5, 2009

(65) Prior Publication Data
US 2011/0101636 A1    May 5, 2011

(30) Foreign Application Priority Data

Apr. 30, 2008 (DE) .......................... 10 2008 021 604

(51) Int. Cl.
*B60B 33/00* (2006.01)
*B62D 39/00* (2006.01)
*B62B 5/04* (2006.01)

(52) U.S. Cl.
CPC ................. *B62B 5/04* (2013.01); *B62B 5/0433* (2013.01); *B62B 5/0485* (2013.01); *B62B 5/0457* (2013.01)
USPC ....................... 280/33.994; 16/35 R; 188/1.12

(58) Field of Classification Search
CPC .......... B62B 5/04; B62B 5/0433; B62B 9/08; B62B 9/082; B62B 9/085; B60T 11/00; B60T 11/04; B60T 11/046; B60T 11/06; B60T 13/02; B60T 13/04
USPC ............ 280/33.994; 188/1.12; 16/18 R, 35 R
See application file for complete search history.

(56) References Cited

U.S. PATENT DOCUMENTS 868,337 A * 10/1907 Geist ............................... 280/88
2,227,301 A * 12/1940 Edmonds ................... 188/204 R
(Continued)

FOREIGN PATENT DOCUMENTS

DE    3900312      2/1990
DE    3900312 A1   2/1990
(Continued)

OTHER PUBLICATIONS

PCT International Search Report for PCT/EP2009/003115 mailed on Aug. 14, 2009.

*Primary Examiner* — J. Allen Shriver, II
*Assistant Examiner* — Travis Coolman
(74) *Attorney, Agent, or Firm* — Kenyon & Kenyon LLP (57) ABSTRACT

A device (1) for generating tensile force and/or pressing force to thereby actuate at least one brake means (19) so as to brake or lock at least two caster wheels (11) of a mobile appliance includes at least one lever (5, 7) prepared for rotation thereof about a fulcrum (15); and at least one transmission means (9) disposed at the lever (5, 7) for transmitting the tensile force and/or pressing force generated during a rotation of the lever (5, 7) to the brake means (19). In addition, a mobile rack and device thereby equipped are specified.

15 Claims, 8 Drawing Sheets

(56) References Cited

U.S. PATENT DOCUMENTS

| | | | |
|---|---|---|---|
| 2,238,322 A | 4/1941 | Hodaly | |
| 2,474,804 A * | 6/1949 | Schwarzbaum | 188/20 |
| 2,684,734 A | 7/1954 | Wilson | |
| 2,873,820 A * | 2/1959 | Rizzuto | 188/20 |
| 3,563,563 A * | 2/1971 | Radovic | 280/79.11 |
| 3,651,894 A * | 3/1972 | Auriemma | 188/19 |
| 3,710,895 A | 1/1973 | Freedman | |
| 3,986,582 A * | 10/1976 | Dye | 188/31 |
| 4,248,445 A * | 2/1981 | Vassar | 280/79.11 |
| 4,360,951 A | 11/1982 | Bucher | |
| 4,526,253 A * | 7/1985 | Schmidt | 188/1.12 |
| 5,170,529 A | 12/1992 | Kovacs | |
| 5,205,381 A * | 4/1993 | Mehmen | 188/19 |
| 5,244,062 A * | 9/1993 | Felton | 188/1.12 |
| 5,301,968 A | 4/1994 | Ward et al. | |
| 5,325,938 A * | 7/1994 | King | 188/19 |
| 5,579,871 A * | 12/1996 | Emmrich et al. | 188/19 |
| 5,634,532 A * | 6/1997 | Bucher | 188/1.12 |
| 5,774,936 A * | 7/1998 | Vetter | 16/35 R |
| 5,899,469 A | 5/1999 | Pinto et al. | |
| 5,979,917 A * | 11/1999 | Thogersen et al. | 280/47.34 |
| 6,240,579 B1 | 6/2001 | Hanson et al. | |
| 6,296,261 B1 * | 10/2001 | deGoma | 280/47.34 |
| 6,364,070 B1 * | 4/2002 | Chen | 188/19 |
| 6,409,187 B1 * | 6/2002 | Crow, Jr. | 280/47.34 |
| 6,460,205 B1 * | 10/2002 | Lewandowski et al. | 5/600 |
| 6,843,349 B2 * | 1/2005 | Walsh et al. | 188/1.12 |
| 7,182,178 B2 * | 2/2007 | Chung | 188/1.12 |
| 7,216,877 B1 * | 5/2007 | Frahm et al. | 280/79.11 |
| 7,480,948 B2 * | 1/2009 | Reinke et al. | 5/86.1 |
| 7,484,740 B2 * | 2/2009 | Miller | 280/87.021 |
| 7,922,182 B2 * | 4/2011 | Van der Vegt | 280/47.36 |
| 8,191,909 B2 * | 6/2012 | Livengood et al. | 280/47.34 |

FOREIGN PATENT DOCUMENTS

| | | |
|---|---|---|
| DE | 9 315 864 | 1/1994 |
| DE | 9315573 | 2/1994 |
| DE | 9 317 219 | 4/1994 |
| DE | 43 18 546 | 12/1994 |
| DE | 698 00 837 | 9/2001 |
| DE | 100 23 600 | 2/2002 |
| FR | 964 745 | 8/1950 |
| FR | 0 967 017 | 10/1950 |
| GB | 376 845 | 7/1932 |
| GB | 376845 A | 7/1932 |
| GB | 1 338 643 | 11/1973 |
| JP | S54102830 U | 7/1979 |
| JP | S58162066 U | 10/1983 |
| JP | 2005-059776 A | 3/2005 |
| JP | 2007-283885 A | 11/2007 |
| WO | WO 99/06260 | 2/1999 |
| WO | WO 2009/012721 | 1/2009 |

* cited by examiner

DEVICE FOR ACTUATING BRAKE MEANS OF MOBILE APPLIANCES

FIELD OF THE INVENTION

The present invention relates to a device for generating tensile force and/or pressing force to thereby actuate brake means. It moreover relates to a mobile rack and to a medical apparatus.

BACKGROUND

From practice, mobile racks and appliances having brakeable caster wheels are known. Such appliances include containers, pieces of furniture, shopping carts, pallet stackers, baby carriages, children's beds, trolleys, tool carts, etc. In connection with patients and hospitals, e.g., hospital beds, hospital gurneys, infusion stands, wheelchairs, treatment means such as dialysis apparatuses and the like having brakeable caster wheels are known. The casters allow to push or wheel the appliance thereby equipped, e.g., from one room to another room. At the destination, it may be secured against inadvertent rolling by braking the caster wheels. The brakes may be actuated either directly in the range of the caster wheel, for instance by means of a foot-operated lever, or indirectly by means of mechanisms for the transmission of a braking force, for which purpose cables or push rods are customarily employed.

The known mechanisms for the transmission of a braking force such as, e.g., those of U.S. Pat. No. 2,684,734, include a multiplicity of movable parts, whereby complexity of maintenance is increased. As a capability to centrally apply and release the braking force for all caster wheels simultaneously and with a same intensity is furthermore desirable, an adjustment of the braking force is altogether rather complex.

It is the object of the present invention to propose another device for braking or locking at least two caster wheels of a mobile appliance. In addition it is intended to specify a mobile rack equipped with such a device, as well as a medical apparatus having a like rack.

SUMMARY

The object of the present invention is achieved through a device for generating tensile force and/or pressing force as disclosed herein.

Thus, in accordance with an example embodiment of the present invention, a device for generating tensile force and/or pressing force to thereby actuate at least one brake means so as to brake or lock at least two caster wheels of a mobile appliance is being proposed. The device includes at least one lever that is prepared for being disposed or is disposed for rotation about a fulcrum. The device further includes at least one transmission means disposed at the lever, whereby tensile and/or pressing forces generated during a rotation of the lever may be transmitted to a brake means. The one or more brake means may be adapted for decelerating the appliance. In particular, the one or more brake means can be designed or embodied for effecting an increasing and/or an adjustable braking action or effect, respectively (in the sense of a braking action that is, in single cases, definable in a targeted manner) and/or a changing braking action. The brake means may advantageously, however, also have the form of locking brakes. Furthermore, the brake means can be designed or embodied as brakes having an additional locking option or mechanism, respectively.

The lever may be provided so as to rotate about a fixed fulcrum, for example by means of reception means for a pinion. Thereby, the fixed fulcrum can be fixed in the sense of stationarily fixed, relative to the mobile or movable or drivable, respectively, appliance that shall be braked or arrested by means of the device.

The lever may, however, also be provided so as to rotate or pivot about a virtual fulcrum.

The lever of the example device of the present invention may in particular have a horizontal position or at least be movable substantially in a horizontal plane during its use. This advantageously contributes to an example device of the present invention being designed with a low height.

The lever may in particular be adapted for mounting so as to centrally rotate on a stationary pinion of a mobile appliance or may be supported correspondingly.

The pinion may then be disposed on the bottom side of the mobile appliance equipped with the example device of the present invention. It may furthermore be disposed in a vertical downwardly orientation.

As the lever is devised for a rotating movement during its use, the example device of the present invention is not only extremely low and space-saving, but at the same time furnishes a simple, mechanical device that requires little maintenance or even no maintenance at all. Due to the possibility of providing on the lever several transmission means for transmitting a tensile force and/or a pressing force engendered during the rotation of the lever, it is advantageously possible to brake a plurality of brake means by using only one moving part, i.e., the lever. Thereby, the example device according to the present invention advantageously offers the possibility of enabling a common braking of arbitrarily combined wheels of a mobile appliance (e.g., both wheels of a common axis; only the front wheels; all rear wheels; arbitrary diagonal wheels etc.) by means of a simple constructional design.

As the example device of the present invention only comprises few parts and furthermore has a small size, the device of the invention is advantageously suited to be mounted subsequently for a simultaneous, central actuation of two or more caster wheel brake means even if no dedicated space was provided on the mobile appliance on the manufacturer's part (for instance, if the distance between the mobile appliance and the plane of a running support is low).

The example device of the present invention is furthermore advantageously characterized by the possibility of independently transmitting forces to two or more caster wheel brake means. Accordingly, even if one of the transmission means having the form, e.g., of cables should lose its function—such as due to breakage of one of the cables—the remaining brake means will remain fully functional.

The example device of the present invention is furthermore characterized by the possibilities of particularly cost-efficient realization and subsequent installation.

In one preferred example embodiment, a device having at least two levers is proposed, which levers are preferably adapted to rotate in opposite directions of rotation. If cable receptions are mounted, e.g., on the ends of each lever, this example embodiment allows an actuation in a same direction of two brake means of respective caster wheels having respective diagonally opposed or adjacent positions, irrespective of cable lengths. An adaptation to a particular application may be carried out in an extremely simple manner by correspondingly shortening the cables to the desired length. The present invention does, however, also encompass solutions where corresponding forces are transmitted to the brake means of the caster wheels not by cables or other pulling means but by means of push rods or other pushing means. In addition, combinations of cables or other pulling means and push rods or the like for the transmission of tensile and pressing forces to a respective one or several brake means are also encompassed by the present invention.

In a further preferred example embodiment of the device according to the invention, a plurality of levers, in particular all levers, are supported rotatably about one and the same fulcrum—in particular a fixed fulcrum. Using this design omits provision of several fulcrums that is of particular advantage in case of less space—not least optionally during mounting the example device according to the present invention at the mobile appliance.

When the fulcrum is fixed—for example, relative to the mobile appliance—or is provided there for being correspondingly fixedly arranged, this again reduces the effort required for the mechanical solution. Moreover, a fixed fulcrum needs less maintenance than a fulcrum being moved during use.

In a further preferred example embodiment of the device of the present invention, the latter includes at least one means for exerting thrust on at least one of the levers so as to cause the latter to rotate. Providing means for exerting thrust serves the purpose of a particularly user-friendly actuation of the device for obtaining a braking effect, for example by pressing down on a pedal. Conversion of the linear motion (thrust of the means) into a rotational motion (rotation of the lever) may be effected through the intermediary of a connection, in particular a rotatably designed connection, between the means for exerting thrust and the lever. Thrust may be applied to the lever, for instance, by means of a push rod or push member having a predetermined distance from its fulcrum, thereby causing the lever to rotate about its fulcrum.

In order to obtain rotary movements of several levers in opposite directions, the means for exerting thrust may drive the first lever in a first location and the second lever in a second location, wherein the common fulcrum of the two levers- or both fulcrums in cases of different fulcrums—may be situated in a range between the first and second locations.

The two levers may be disposed above and below each other, in which case they have cross-type or scissor-type relative positions. In order to further reduce the space occupied by them, they may also be arranged in a side-by-side or front-rear relationship in a vertical direction relative to a plane of a running support of the mobile appliance. The means for exerting thrust may consist of several parts.

In a further preferred example embodiment of the device according to the present invention, the two or more levers are provided rotatably about exactly one fixed fulcrum, respectively, or are provided for being rotated about exactly one fixed fulcrum.

In a further preferred example embodiment, the means for transmitting the generated tensile force and/or pressing force includes at least one compression spring. The compression spring may have a respective design and arrangement ensuring a homogeneous braking force for all the caster wheel brake means subject to braking by the device of the present invention. Fine or subsequent adjustment of the braking force may be left to the individual compression spring. To this end, the compression springs are preferably each provided on the cable reception of the lever. They may, however, also be provided on the side of the brake means of the caster wheels or in a central range of the transmission means (e.g., of the cable) between lever and brake means.

The object of the present invention is furthermore attained through a mobile rack, as well as by a medical apparatus. As the advantages obtainable by means of the example device of the present invention may hereby be obtained undiminished, express reference is now made to the above discussion thereof in order to avoid repetitions.

The present invention shall in the following be explained exemplarily by referring to the appended drawings. Same or identical reference numerals designate identical or similar components in the drawings.

DETAILED DESCRIPTION

Figure 1:
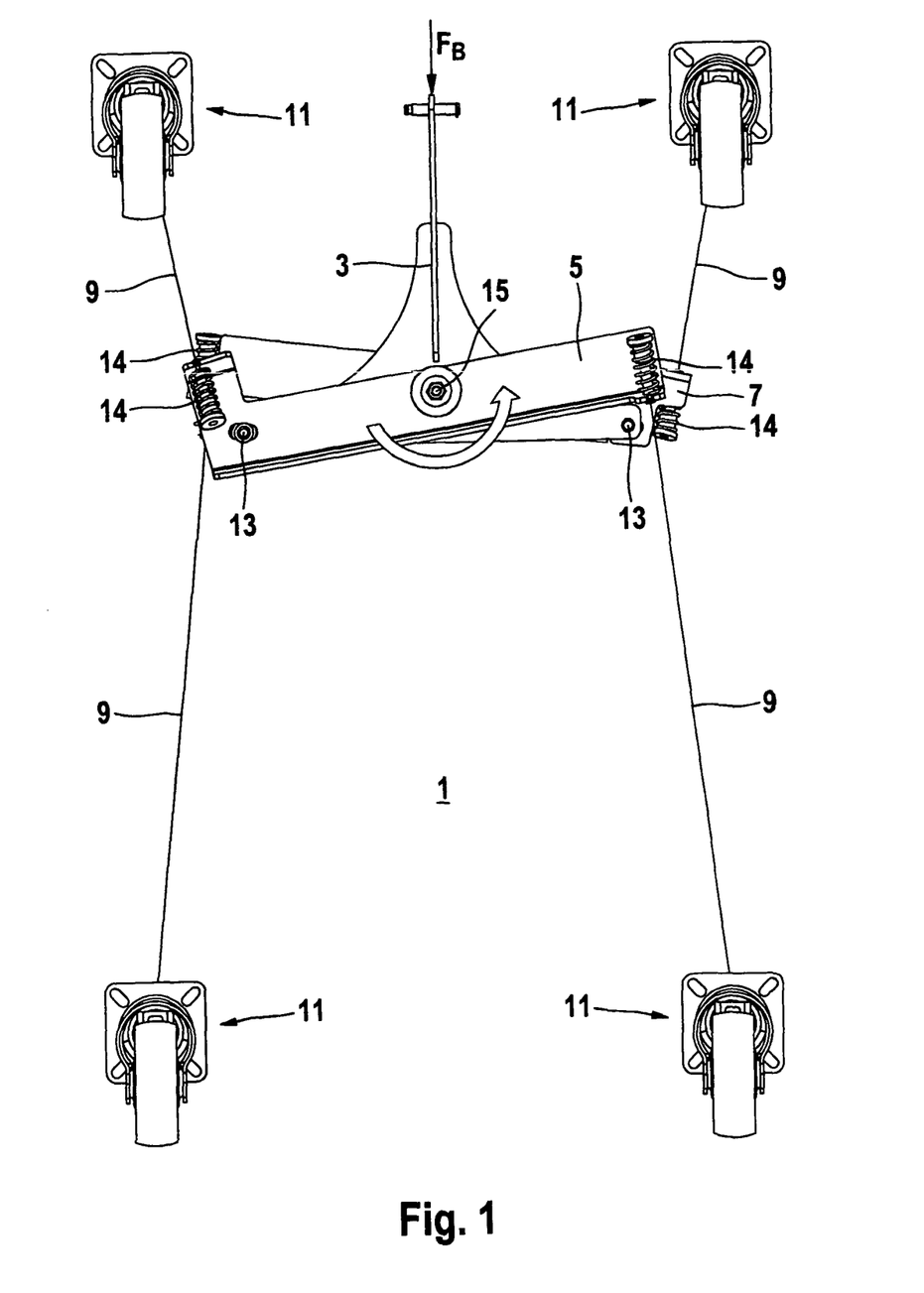
FIG. 1 is a schematically simplified representation of an example device of the present invention for generating tensile force and/or pressing force in co-operation with four brake-able caster wheels in a simplified plan view.

FIG. 1 shows a device of the invention 1 including a push rod 3 and two levers or cross-levers 5 and 7, respectively. In the example of FIG. 1, the device 1 comprises four transmission means for transmitting the tensile force generated during a rotation of levers 5, 7, which transmission means have the form of cables or brake cables 9 in FIG. 1. The brake cables 9 each extend from one end of a lever 5, 7 to a brake means (not represented in FIG. 1) of caster wheels 11.

The push rod 3 co-operates with levers 5, 7 via pinions 13 for rotatably coupling the push rod with the levers. The levers 5 and 7 include compression springs 14 which allow an automatic setting of the forces transmitted by means of the brake cables 9, and thus of the braking effect. This setting of the braking force is also possible when using brake rods instead of brake cables.

When a braking force is passed over from the direction of the arrow marked $F_B$ via the push rod 3 and the pinion 13 to the levers 5, 7, the latter are rotated clockwise (lever 7) or counterclockwise (lever 5) about a pinion 15 representing their fulcrum.

Figure 2:
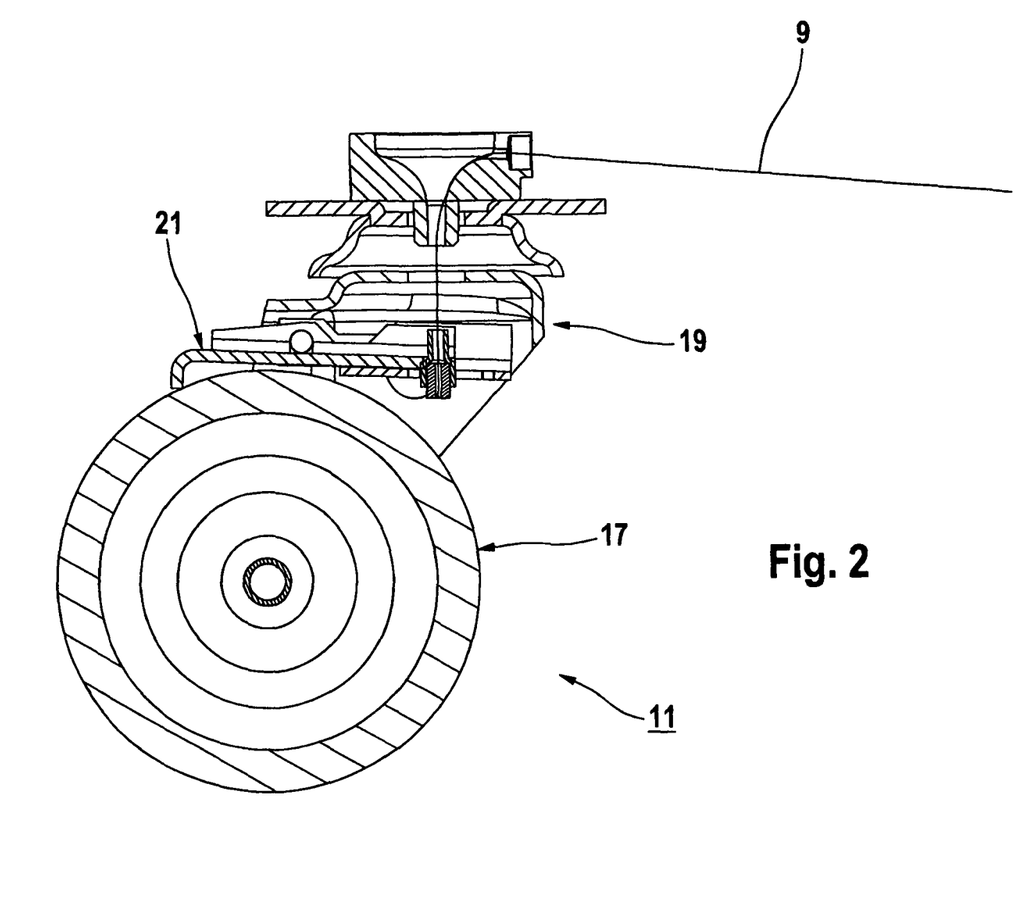
FIG. 2 is a cross-sectional view of a caster wheel including one brake means.

FIG. 2 shows a sectional view of a caster wheel 11 having a tread 17 on which a brake lever 21 acts by pressure in the braking condition of the brake means 19 shown in FIG. 2. This pressure is transmitted by the brake cable 9 to the brake means 19 and is released when the tension on the brake cable 9 is released. Disengaging the brake lever 21 from the tread 17 may be favored or aided by means of a reset spring means disposed, e.g., within the brake means 19.

Figure 3:
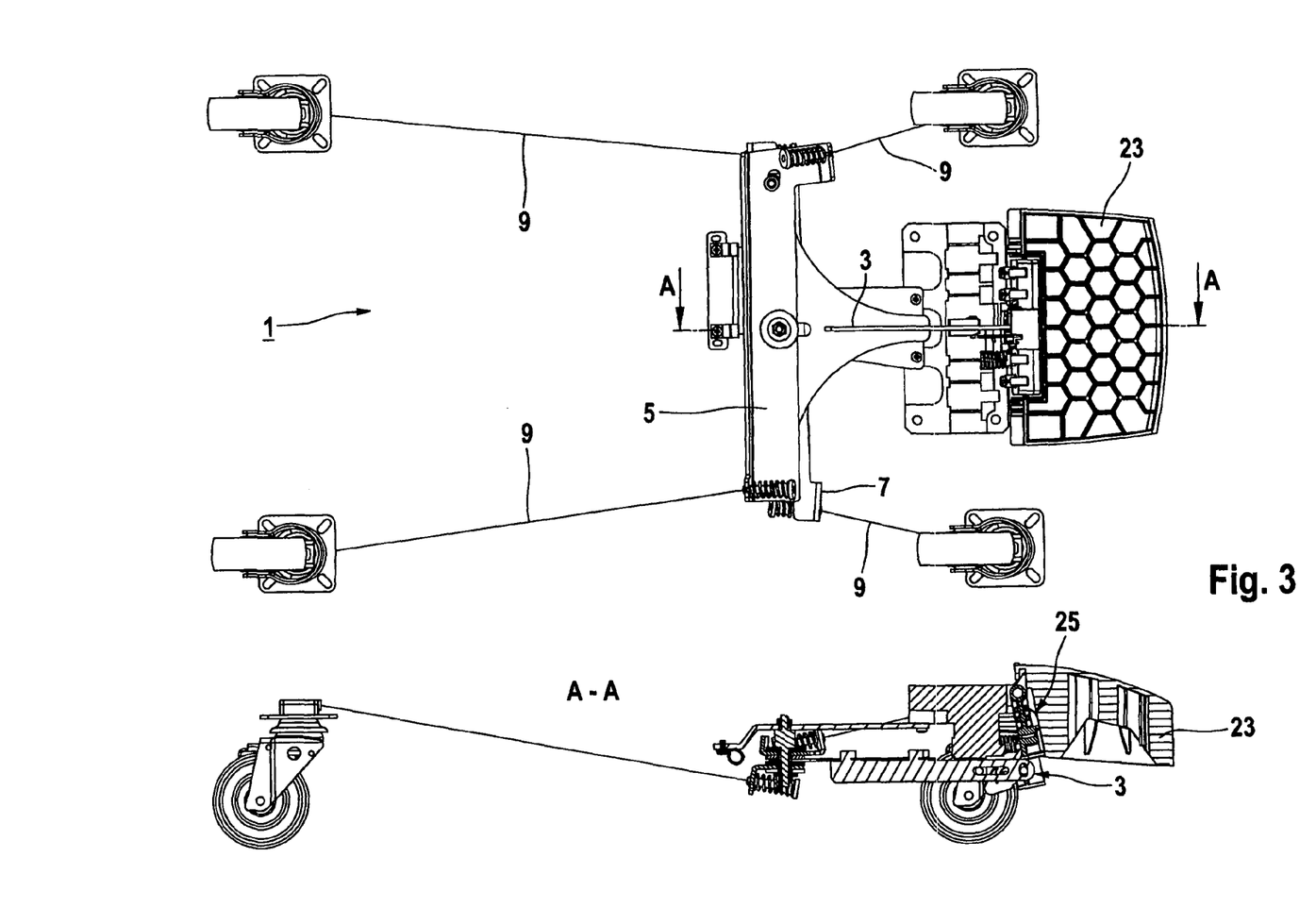
FIG. 3 shows the example device of the invention of FIG. 1 in an unbraked condition of the device.

FIG. 3 shows the device 1, already shown in FIG. 1, having a pedal 23 for generating the push force to the push rod 3. In the lower area of FIG. 3 a sectional view along line A-A of the plan view of the upper area of FIG. 3 is shown. An intermediate lever 25 (between pedal 23 and device 1) allows generating the push force in the direction represented by arrow $F_B$ in FIG. 1 relative to the device 1 by stepping down on the pedal 23. The intermediate lever 25 allows the pedal 23 to attain the same starting position upon each actuation of the pedal 25 with the aid of a compression spring.

Figure 4:
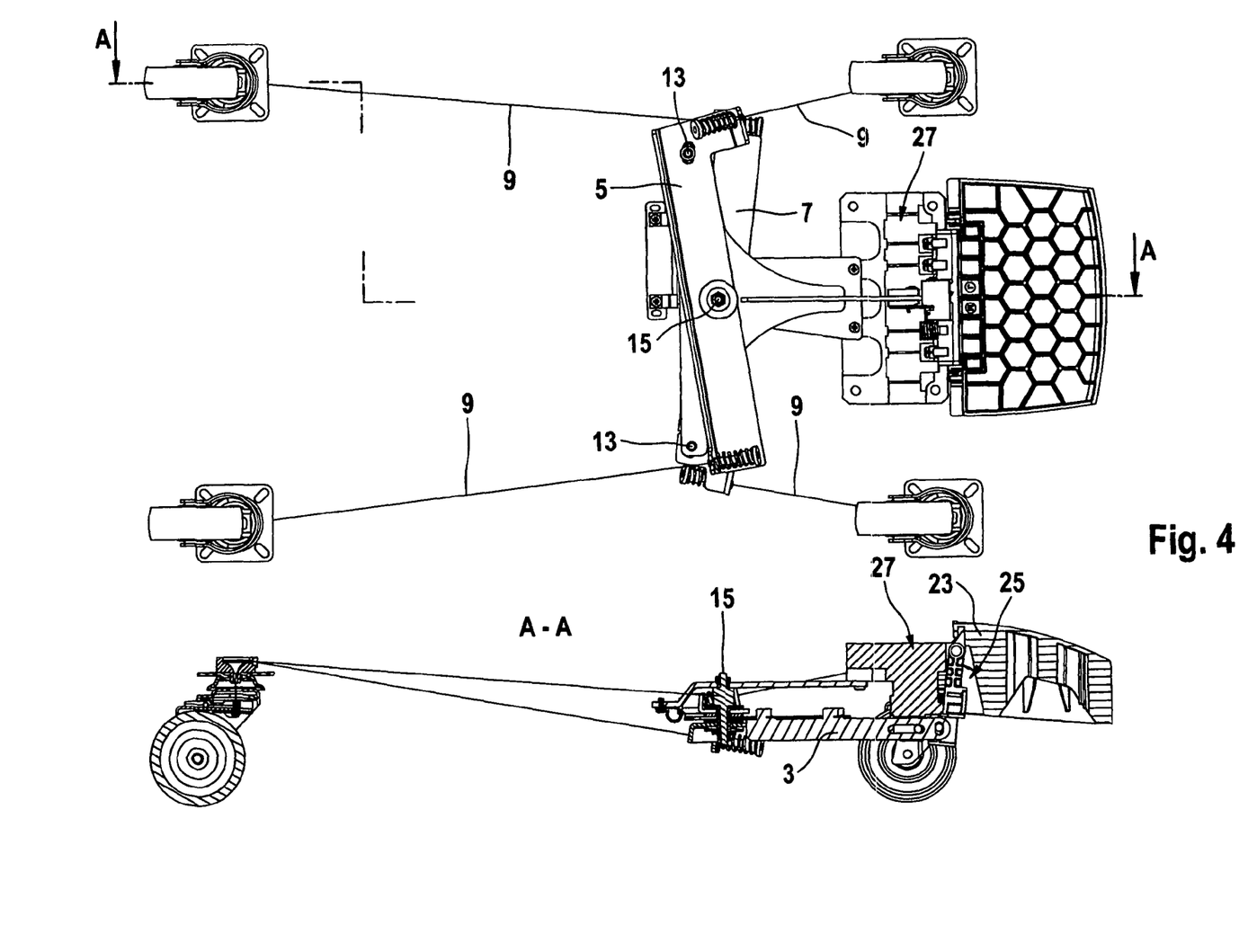
FIG. 4 shows the example device of FIG. 3 in a braked condition of the device.

FIG. 4 shows the device 1 of FIG. 3 in the braked condition. It is clearly visible that the levers 5, 7 now have an angled, scissor-type relative position and are exerting a tensile force on the brake cables 9 owing to their position relative to the pinion 15. In a comparison of the cross-sectional views of FIGS. 3 and 4 it is clearly visible how vertical pressure—for example through the foot on the brake pedal or pedal 23—by means of the intermediate lever 25 moves the push rod 3 to the left-hand margin of FIGS. 3 and 4, resulting in the rotation of levers 5, 7 shown in FIG. 4 owing to the pinion connections 13 between push rod and levers 5, 7. FIGS. 3 and 4 moreover show a bearing block 27 to which the pedal 23 is fastened. The bearing block 27 thus serves for mounting the push rod 3 and the pedal 23.

Figure 5:
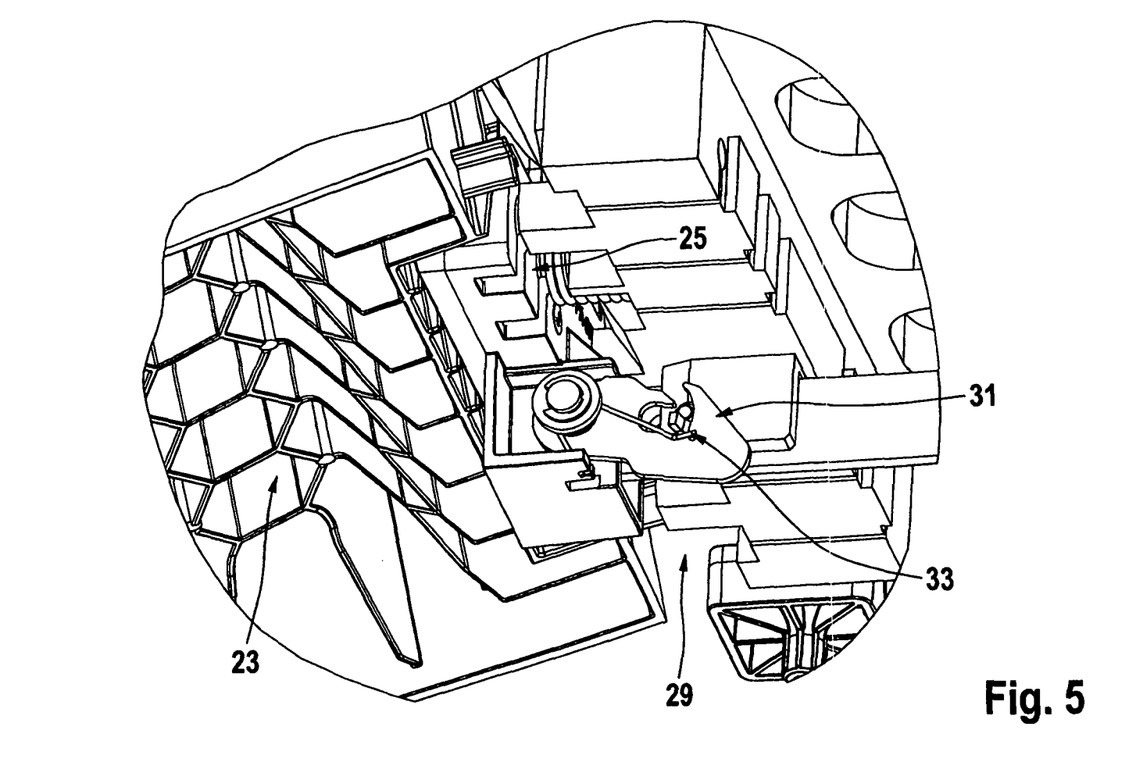
FIG. 5 is a partial view of a brake pedal including latching means.

FIG. 5 shows a latching means 29 including a latching element 31, as well as a release tab 33 provided on the latching element 31. Upon actuation of the pedal 23, the latching element 31 is pushed against a pin. As a result of the inclined portion on the latching element 31, the latching element rotates downwards. When the direction of rotation is changed, the transversely extending pin hooks into the latching element 31 to thus retain the braked position. The latching element 31 keeps the intermediate lever 25 in the braked position. Upon repeated actuation of the pedal 23, the latching element 31 is again released, allowing the intermediate lever 25 to change its position.

Figure 6:
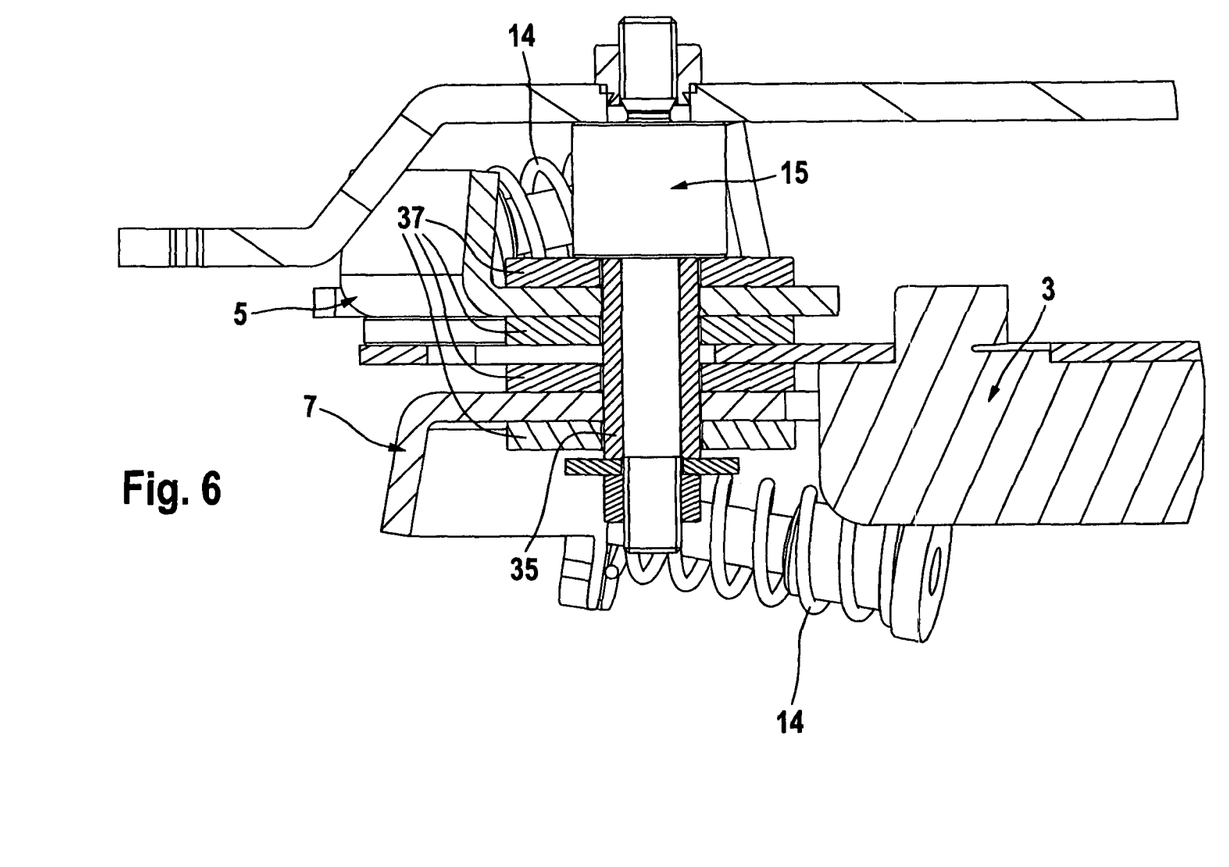
FIG. 6 is a detail view of a portion of an example device of the present invention.

FIG. 6 shows a cross-sectional view of a possible embodiment of the levers 5, 7 in the area of the pinion 15 representing their fulcrum. The pinion 15 is surrounded in portions thereof by a bearing sleeve 35 which ensures rotatability of, i.a., the levers 5, 7 relative to each other. In the representation of FIG. 6, the levers 5, 7 as well as other elements are spaced apart by means of spacer washers 37.

Figure 7:
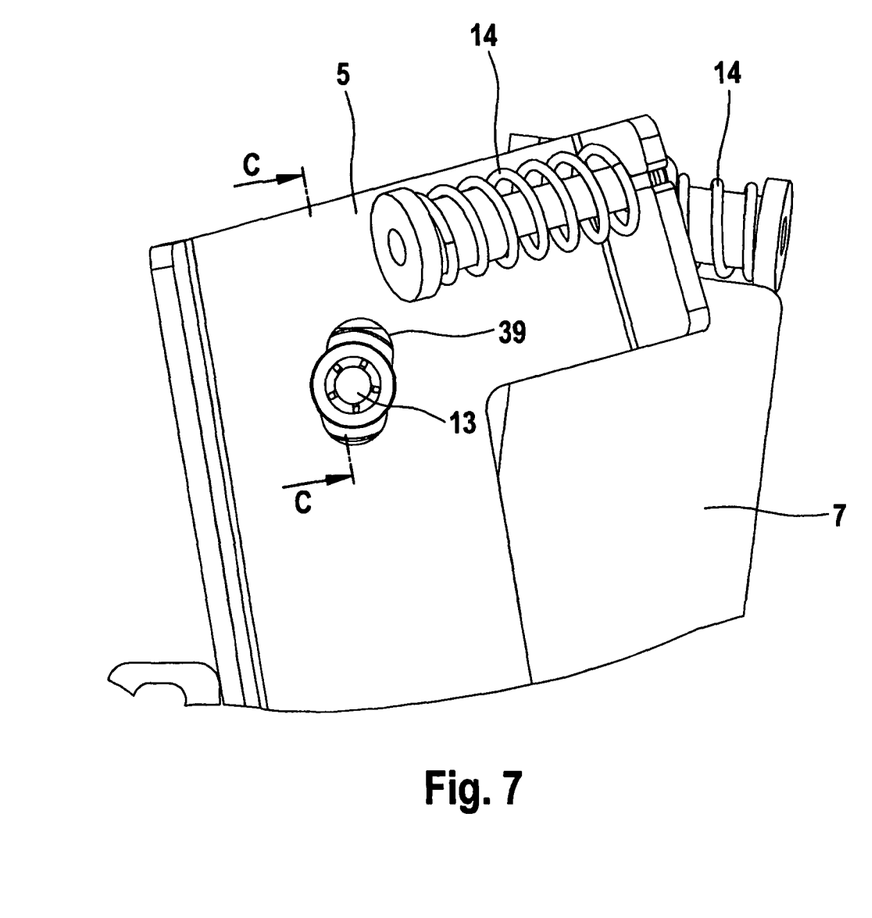
FIG. 7 shows a portion of two levers of an example device of the present invention for generating a tensile and/or a pressing force.

FIG. 7 shows portions of levers 5, 7 in an embodiment of the device in accordance with the invention. The lever 5 of FIG. 7 has an opening 39 for the passage of a pinion 13 in order to couple the lever 5 to a push rod 3 (not shown in FIG. 7).

Figure 8:
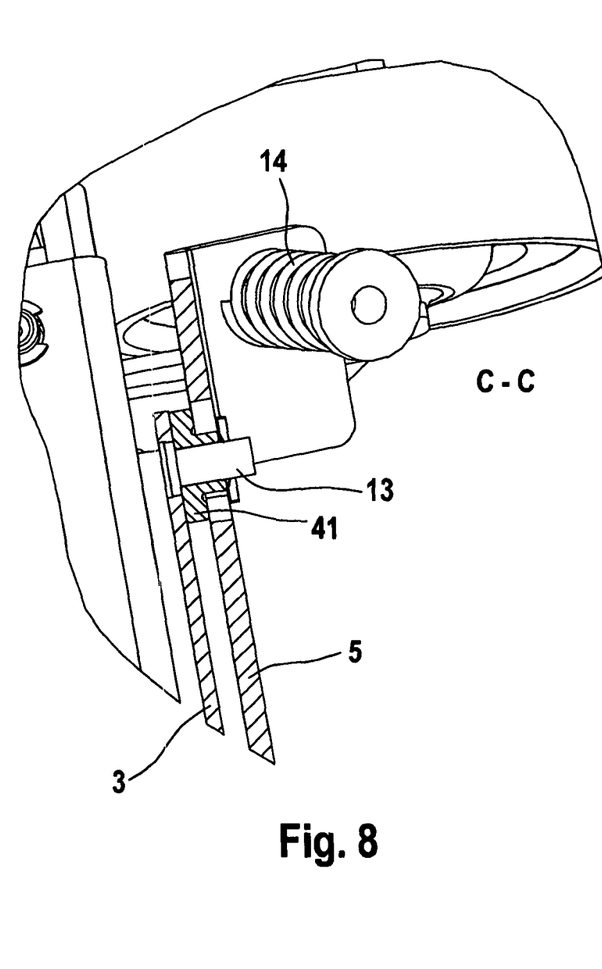
FIG. 8 is a sectional view along line C-C of FIG. 7.

FIG. 8 shows a sectional view along line C-C of FIG. 7. The pinion 13 is mounted in a bearing sleeve 41 so as to allow a relative movement between pinion 13 and lever 5.

Figure 9:
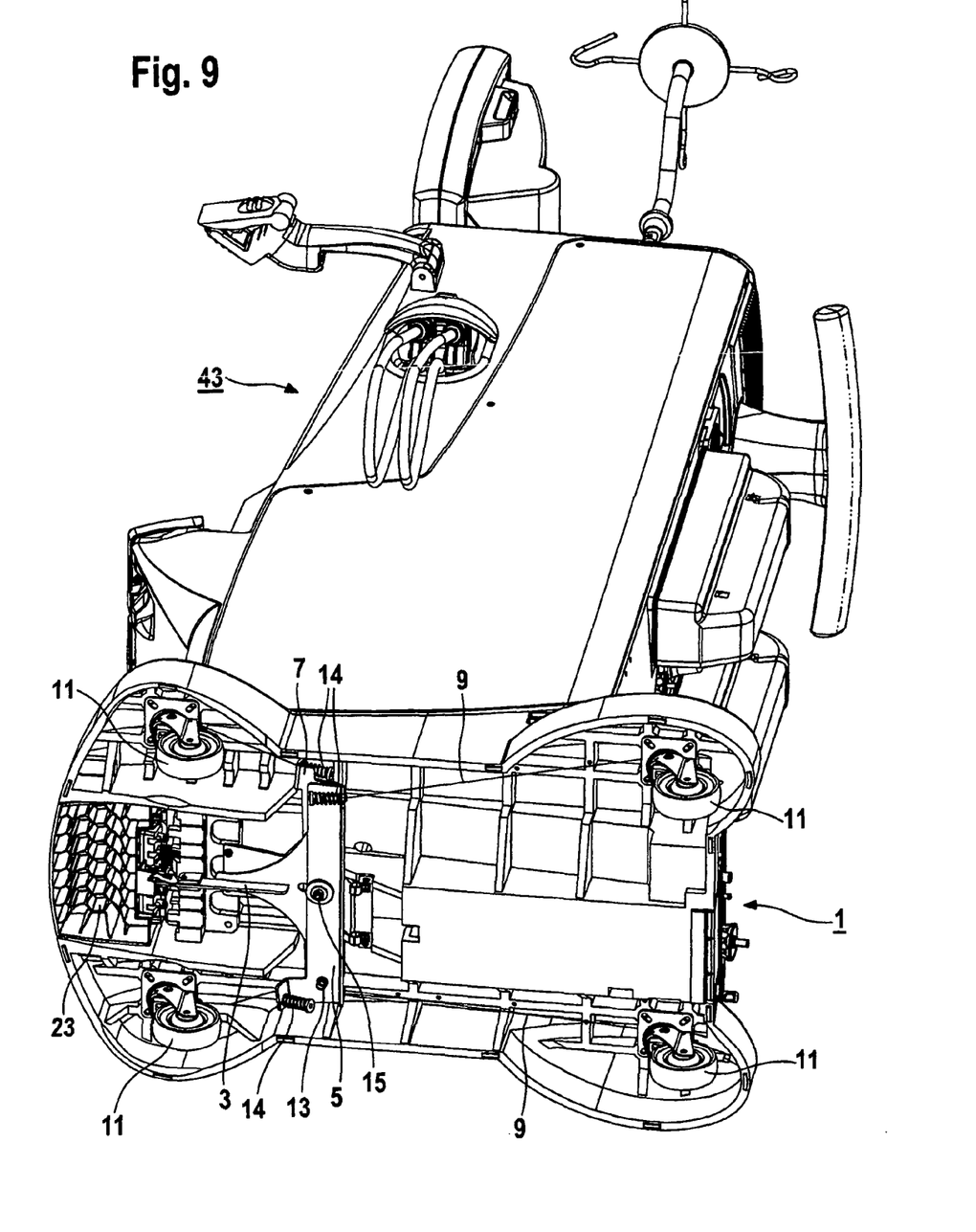
FIG. 9 shows an example dialysis apparatus including an example device of the present invention.

FIG. 9 shows a dialysis apparatus 43 as one example of a medical apparatus including a device 1 of the invention in a perspective view obliquely from below. FIG. 9 in particular shows elements which were already shown, inter alia, in FIGS. 1, 3, 4, and 5 and are discussed in the above discussion. In order to avoid repetitions, reference is therefore now made to the above discussion.

The invention claimed is:

1. A device for generating tensile force and/or pressing force to thereby actuate four brake means so as to brake or lock four caster wheels of a mobile appliance, said device including:

two levers that are prepared for being disposed so as to rotate about a fulcrum, or two levers being rotatable about a fulcrum, wherein rotation of the two levers takes place about a common fulcrum; and at least four transmission means disposed at the levers, for transmitting the tensile force and/or pressing force generated during the rotation of the two levers to the four brake means, wherein at least two transmission means extend from opposite sides of each lever;

wherein the two levers are prepared for a disposition in which the two levers are rotatable in opposite directions of rotation relative to each other.

2. A mobile rack having at least four caster wheels and at least one device according to claim 1, wherein the two levers are disposed for rotation in a plane parallel to the plane of a running support of the caster wheel.

3. The rack according to claim 2, having one pedal for bringing about the braking effect.

4. The rack according to claim 3, wherein the pedal is depressible.

5. A medical apparatus, including a mobile rack according to claim 2.

6. The medical apparatus of claim 5, wherein the medical apparatus is a blood treatment apparatus.

7. A mobile rack having at least four caster wheels and at least one device according to claim 1 for simultaneously acting on at least two of the caster wheels so as to brake the at least two of the caster wheels, wherein the two levers are disposed for rotation in a plane parallel to the plane of a running support of the caster wheel.

8. The rack according to claim 7, wherein the at least two of the caster wheels are not arranged diagonal to each other at the mobile appliance.

9. The rack according to claim 7, wherein the at least two of the caster wheels are arranged adjacent to each other at the mobile appliance.

10. The device according to claim 1, including at least one means for exerting thrust on at least one of the levers so as to cause the at least one of the levers to rotate about its fulcrum.

11. The device according to claim 10, wherein the at least one means for exerting thrust has the form of a push rod or a push member.

12. The device according to claim 1, wherein at least one lever is rotatable about exactly one fulcrum, respectively.

13. The device according to claim 12, wherein all of the levers are rotatable about exactly one fulcrum, respectively.

14. The device according to claim 1, wherein the at least four transmission means for transmitting the generated tensile force and/or pressing force to the four brake means includes at least one compression spring.

15. The device according to claim 1, wherein the fulcrum is a fixed fulcrum.

* * * * *